J. S. LAPHAM.
HANDLE.
APPLICATION FILED SEPT. 2, 1920.
1,383,826.
Patented July 5, 1921.
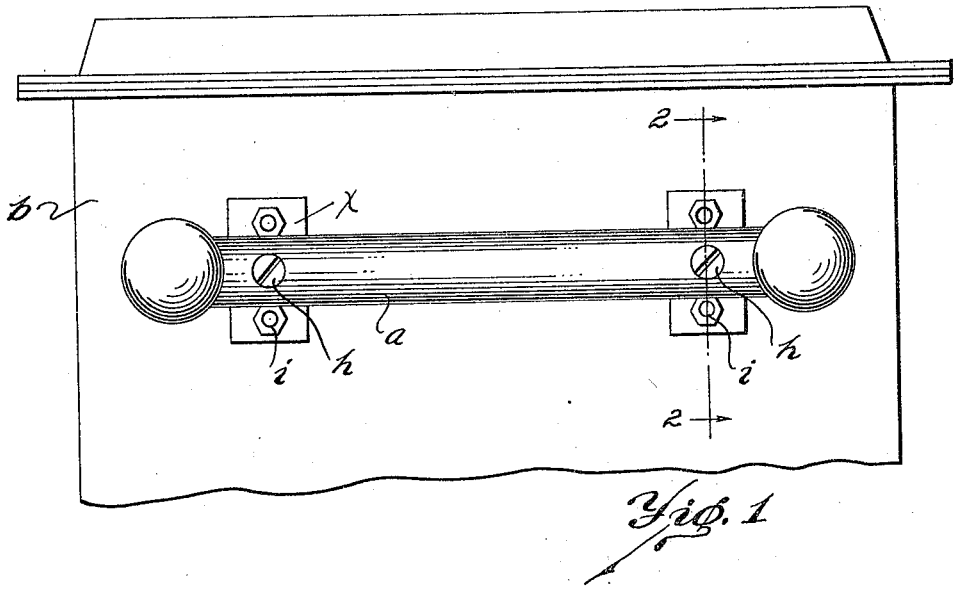
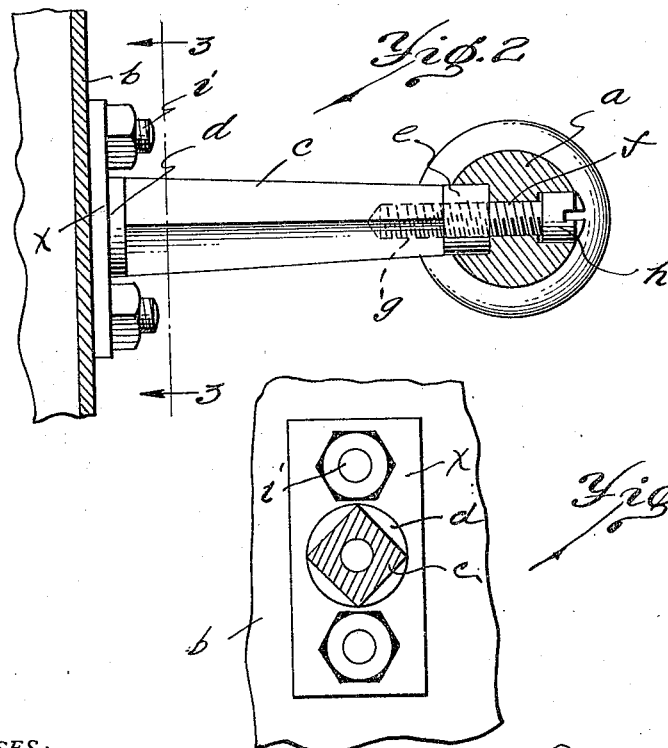
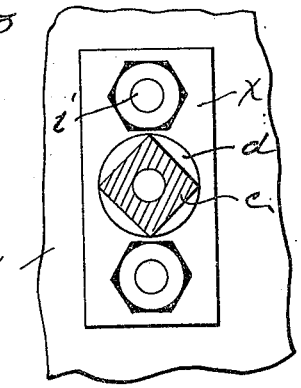
WITNESSES:
INVENTOR.
BY
, ATTORNEY

UNITED STATES PATENT OFFICE.

JARED S. LAPHAM, OF NORTHVILLE, MICHIGAN, ASSIGNOR OF ONE-HALF TO JAMES T. McMAHON, OF TOLEDO, OHIO.

HANDLE.

1,383,826.   Specification of Letters Patent.   Patented July 5, 1921.

Application filed September 2, 1920. Serial No. 407,685.

*To all whom it may concern:*

Be it known that I, JARED S. LAPHAM, a citizen of the United States, residing at Northville, in the county of Wayne and State of Michigan, have invented certain new and useful Improvements in Handles, of which the following is a specification.

This invention relates to handle brackets or arms, and has for its object a handle bracket so designed that in connection with the screw that secures the handle to the bracket an effective thread lock is secured which prevents the screw from turning out. Furthermore, practically the entire load of the handle and any load that may be placed upon it is carried upon the larger portions of the handle and screw and taken off the threads. This will be better explained when the construction is explained in detail.

In the drawings,—

Figure 1 is a front elevation of the handle.

Fig. 2 is a cross section of the same.

Fig. 3 is a section on the line 3—3 of Fig. 2.

The handle here shown is a handle by which a portable washing machine $b$ is moved about. This is simply shown as an example. Obviously the invention is capable of use wherever a handle, or for that matter any similar member, is employed. The handle comprises a bar $a$ (preferably of wood) of circular cross section (but, of course, the cross section is immaterial). The bracket or fixture comprises a base $x$ and a spindle portion $c$ which is pyramidal for the main portion of its length but which at the zone where it merges into the base is formed into a cylindrical portion $d$ for artistic effect. However, the outer end of the spindle is formed into a cylindrical portion $e$ for a distinct functional purpose, as will be explained. The cap screw $f$ runs through threads prepared in the wooden bar $a$ and also into a tapped cavity $g$ running coaxially into the end of the spindle. From Fig. 2 it will be seen that the wooden bar $a$ is drilled for the threaded shank of the screw and that this drilled hole is also counterbored in two sizes, one for the cylindrical load-carrying portion $e$ of the spindle and the other to receive the head $h$ of the cap screw.

The parts are assembled together by screwing the cap screws $f$ into the bar $a$ and then the brackets are turned on to the protruding ends of the screws until they draw tightly on the cap screws so as to jam the cap screw threads tightly into engagement with the threads of the bar $a$. In this respect the bracket acts in precisely the same way as the jam-nut does to lock a nut to the threads on which it runs. Hence when the brackets have been turned so as to hold tightly on the screws to jam them into engagement with the threads, the whole assembly acts as a thread lock to prevent the screws $f$ from turning out. This is a particularly secure one because the jamming members cannot possibly themselves become loose by turning for the reason that after they have been so turned to jam the threads of the screws and the bar, the bases of the fixtures are bolted to the side or supporting wall $b$ by the bolts and nuts $i$, for example. Of course, any other suitable fastening means could be used.

The load of the bar $a$ or any pressure exerted upon it is practically all taken by the large cylindrical portion $e$ at the end of the spindle and the cylindrical head $h$ of the cap screw for the threads cut themselves free of the load, and hence the threads are in no way impaired by being subjected to the load. The load-carrying portion $e$ of the sprindle being circular in cross section, permits the same to be inserted in the counterbore and at the same time turned to effect the locking action already described.

What I claim is:

In a handle having in combination, a handle member bored to receive the shank of a screw and provided with a counterbore at each end of the said bore, a fixture or bracket for attachment to a supporting member and provided with a spindle portion having a load-carrying end adapted to engage one of the counterbores and a screw having a threaded shank portion adapted to engage in the bore and a head portion adapted to engage in the other counterbore, the threaded shank engaging also in a tapped opening in the end of the said spindle.

In testimony whereof I affix my signature.

JARED S. LAPHAM.